United States Patent [19]

Tarwid

[11] 4,054,498
[45] Oct. 18, 1977

[54] WHITE PHOTOPOLYMERIZABLE EPOXIDE COMPOSITIONS

[75] Inventor: Wesley Albion Tarwid, Barrington, Ill.

[73] Assignee: American Can Company, Greenwich, Conn.

[21] Appl. No.: 712,963

[22] Filed: Aug. 9, 1976

[51] Int. Cl.$^2$ .................... C08F 8/18; C08F 8/34
[52] U.S. Cl. .................... 204/159.11; 96/115 P; 204/159.14; 204/159.18; 204/159.24; 260/37 EP; 260/830 TW; 260/836; 260/837 R; 260/42.28; 427/54; 428/418
[58] Field of Search .................... 204/159.11, 159.14, 204/159.18, 159.24; 427/54; 260/37 EP

[56] References Cited

U.S. PATENT DOCUMENTS

| 3,794,576 | 2/1974 | Watt | 204/159.11 |
| 3,930,971 | 1/1976 | Karoly et al. | 204/159.11 |

*Primary Examiner*—Richard B. Turer
*Attorney, Agent, or Firm*—Robert P. Auber; Ira S. Dorman; Ernestine C. Bartlett

[57] ABSTRACT

White pigmented, liquid, substantially solvent-free coating compositions are provided which may be rapidly cured to a solid, tightly adherent, opaque white coating upon exposure to radiation and particularly to electromagnetic radiation. More specifically, the compositions comprise epoxy monomers or prepolymers blended with a bis (epoxycycloalkyl)ester, a radiation-sensitive catalyst precursor effective to initiate polymerization of the epoxides upon exposure to radiation and certain alumina treated titanium dioxides, preferably of the rutile type.

14 Claims, No Drawings

WHITE PHOTOPOLYMERIZABLE EPOXIDE COMPOSITIONS

BACKGROUND OF THE INVENTION

Transparent, substantially solvent-free coatings of the epoxide type have been developed which cure by polymerization of the resinous components, curing being initiated by radiation sensitive initiators which form Lewis acid catalysts upon being subjected to electromagnetic radiation. These coatings avoid many of the problems of conventional protective coatings which are applied from various solvent systems, such problems including the necessity for solvent removal and recovery, the fire and explosion hazards associated with solvent systems, pinholeing of the coating caused by solvent release, softening and running of the coating under the effects of the heat which is required to hasten the process of solvent removal and finally, the possibility of damage to the coating components by the temperatures often encountered in solvent removal.

Although it has been recognized that these and other disadvantages of solvent based coating systems may be avoided through use of the radiation-cured solventless coatings, their use has hitherto been limited to the application of either transparent coatings or lightly pigmented, i.e. up to about 15%, because the presence of opacifying pigments in the coating compositions has seriously impaired or prevented the necessary transmission of the radiation which is required to activate the catalyst precursors causing the curing of the coating by polymerization of the epoxide components. Furthermore, radiation cured coatings containing a pigment in sufficient concentration to effectively mask the substrate (generally, at least about 25-30% titanium dioxide is the minimum pigment concentration necessary for satisfactory masking of the substrate) are generally accompanied by inadequate adhesion to the substrate and/or poor flexibility, inadequate gloss, off-color or lack of whiteness and a tendency to blush or have a chalky appearance after immersion in hot water.

Coatings which are to be applied to a substrate and then overprinted with decorative or identifying indicia must satisfy a number of functional criteria. For example, a radiation-curable coating which is to be applied as an undercoating for the decorative material on a metallic food or beverage container such as a sealed metal can must be capable of smooth, even application in a thin coating, must cure rapidly after exposure to irradiation, must have sufficient opacity to mask the substrate completely, must adhere tightly to the substrate throughout the processing steps of filling and sealing the can, must be sufficiently flexible to withstand forming and sealing operations carried out on the can and the can ends, must be receptive to the printed decorative material to be overlaid thereon and must withstand, without deterioration of any of these properties and without change in the color of the coating, high temperature aqueous medium used in pasteurization of various foods and beverages often packaged in metal cans. These and other criteria are satisfied by the radiation cured, opaque, epoxide type coatings of this invention containing up to about 40% to about 50% of a particular surface treated titanium dioxide pigment which allows rapid cure of the epoxide vehicle components under the influence of electromagnetic or electron beam radiation.

It is therefore an object of the present invention to provide a substantially solventless, pigmented, liquid coating composition of the epoxide type which, upon application to a solid substrate and exposure to suitable radiation, will cure to a tightly adherent white, opaque protective coating which masks the substrate and which is receptive to printing or other decorative or identifying indicia.

It is a further object of this invention to provide epoxide coatings for metal, paper and plastic articles, which coatings contain pigment loadings as high as 40 to 50% by weight of the coating solids and which may be rapidly cured to an opaque protective film after exposure to irradiation.

It is a further object of this invention to provide a substantialy solvent-free, radiation-curable epoxide coating composition containing a high loading of a pigment which does not substantially retard the curing rate of the coating upon exposure to irradiation which imparts a high degree of opacity to the coating.

Further objects will become apparent from the detailed description and examples set forth in the following specification and claims.

SUMMARY OF THE INVENTION

This invention provides a white pigmented epoxide coating composition which may be applied to a substrate of metal, paper or plastic and cured to a glossy opaque coating by exposure to electromagnetic or electron beam radiation. The pigment, which may be included in the composition in amounts up to about 40 to about 50% by weight of coating solids without substantially affecting the curing properties of the composition, is a titanium dioxide which has been surface treated with aluminum oxide, as more fully discussed hereinafter. The coating composition comprises epoxide materials in a liquid state comprising at least about 15% of an epoxy cycloalkyl ester, together with a specific diazonium compound which, under the influence of actinic radiation, decomposes to form a Lewis acid which initiates the polymerization of the coating components through their epoxy groupings. Epoxides that do not comprise the epoxy cycloalkyl ester or titanium dioxide which is not treated with aluminum oxide, or which has been treated with other known titania surface treatment agent such as silica, magnesia, organic amines or the like, are not effective in the process of the present invention, since coatings prepared therewith are deficient in one or more of the aforementioned properties which are of critical importance in the commercial acceptance of the coated sheet material product.

DETAILED DESCRIPTION OF THE INVENTION

In accordance with the present invention, a coating composition is provided comprising a "vehicle" or fluid portion and a pigment or solid portion carried by and suspended in the vehicle. The primary functional components of the vehicle include a blend of epoxide materials which is fluid at room temperature and is capable of polymerization under the influence of a cationic catalyst to form a cured coating on a chosen substrate material. Together with the polymerizable components is a specific radiation-sensitive catalyst precursor 2,5-diethoxy-4-(p-tolylthio)benzene diazonium hexafluorophosphate which, under the influence of electromagnetic or electron beam radiation, will release a Lewis acid type catalyst capable of initiating the polymerization of the epoxide components to form a cured coating film.

The pigment is titania, or titanium dioxide, in finely divided particulate or pulverulent form, for example, of an average particle size in the range of about 100 to 400 nanometers ($10^{-9}$ meters), which has been subjected to a surface treatment resulting in the deposition on the titania particulate surface of a coating of between about 1% and about 10% and preferably between about 2% and 6%, based on the weight of titania, of an oxide of aluminum, preferably alumina.

In the preparation of finely divided titanium dioxide for use as a pigment in paints, printing inks and coatings for a variety of substrates, it has been common practice to subject the pigment particles to an after-treatment which deposits on the particles a coating of a stabilizing material such as an oxide or hydrated oxide of silicon, magnesium or aluminum, an amine or organic compound. Frequently, the aftertreatment involves a mixture of two or more of such treating agents. The aftertreatment is designed to upgrade the properties of titanium dioxide providing improved resistance to yellowing, weathering and chalking and more ready dispersability of the pigment in the fluid vehicle of the paint, ink or coating. For example, U.S. Pat. Nos. 3,086,877 and 3,220,867 describe aftertreatment processes wherein alumina is coated on titanium dioxide. U.S. Pat. No. 3,523,810 describes an aftertreatment involving both silica and alumina and U.S. Pat. No. 3,523,809 describes an aftertreatment involving both silica and magnesia.

It has been found in the practice of the present invention, if coatings exhibiting the combined properties enumerated above are to be produced, the coating must contain the following specific components in combination: 1) titanium dioxide surface treated with an aluminum oxide; 2) an epoxy blend containng at least about 15% by weight of an epoxy cycloalkyl ester and 3) as the initiator, 2,5-diethoxy-4-(p-tolythio) benzene diazonium hexafluorophosphate.

Titanium Dioxide Pigment

Titanium dioxide which has been surface treated with aluminum dioxide is uniquely satisfactory to provide the satisfactory combination of properties. It has been found that if one of the other surface treatments such as silica or triethanolamine were present, either alone or in combination with alumina, not all of the desired film properties are obtained. Either whiteness, gloss, flexibility or adhesion characteristics of the coating are downgraded and unsatisfactory. A variety of commercially available alumina treated titanium dioxides have been found to perform satisfactorily including those available as R-110, R-910 and R-900 (E.I. DuPont); Zopaque R-99 (Glidden) and Unitane OR-600 (American Cyanamid). It is preferred that the coated titanium dioxide be in rutile form since consistently superior results have been obtained therewith although, as illustrated hereinbelow, the coated anatase form may be suitable also although not as useful as the preferred form. The alumina treatment ranges from about 1 to about 10% on all of these pigments with 2% to 6% being the preferred range, based on the weight of the pigment.

The titanium dioxide level in the compositions is satisfactory up to about 50% by weight of the composition with about 35% to 40% being especially preferred. Above about 40%, the opacity increases to the point that the longer exposure times necessary to cure the coatings makes them less useful. For the purposes of this invention, satisfactory coatings are those that cure within about 10 to 15 seconds after exposure to irradiation with or without heating in an oven, if desired. At the 55% to 60% loading pigment levels, the flexibility properties of the coating begin to become less than optimum. At the preferred 35% to 40% level the excellent overall combination of coating properties is obtained.

Epoxides Blend

Epoxides which are particularly suitable for use as the vehicle in preparing opaque pigmented coatings of the present invention have been described in detail in U.S. Pat. No. 3,794,576 issued Feb. 26, 1974 to William R. Watt and commonly assigned herewith. The unpigmented compositions disclosed in the Watt patent include blends of epoxides that are fluid at room temperature and include: A) at least about 15% by weight of an ester having two epoxycycloalkyl groups, designated for convenience as a bis (epoxycycloalkyl) ester, (b) a monoepoxide material and/or (c) a prepolymeric material or blend of prepolymeric materials such as for example diglycidyl ethers of bisphenol A, epoxyphenol or epoxy cresol novolacs, polyglycidyl thers of polyhydric alcohols or diepoxides of cycloalkyl hydrocarbons or ethers. Such components, to insure fluidity at room temperature, have epoxide equivalent weights below 200 and constitute approximately 10 to 85% by weight of the epoxidic materials in the compositions.

Such essentially solventless epoxide compositions as disclosed and described in said U.S. Pat. No. 3,794,576 are particularly suitable herein, the disclosure of which is hereby incorporated by the aforegoing references thereto. Specific examples of typical epoxides forming the vehicle herein may be represented by the following group of materials:

A. Bis (epoxycycloalkyl) ester

A primary and essential epoxide component of the vehicle utilized in this invention is an ester having two epoxycycloalkyl groups, conveniently an ester of an epoxidized cyclic alcohol and an epoxidized cycloalkane-carboxylic acid. Examples of suitable esters are (3,4-epoxycyclohexyl) methyl 3,4-epoxycyclohexane carboxylate and bis [3,4-epoxy-6-methylcyclohexyl) methyl] adipate and the like. Such components must comprise at least about 15% by weight of the epoxide material forming the vehicle of the invention since it has been found that blends without the ester either do not cure rapidly enough or are deficient in terms of adhesion.

B. Monoepoxides

A further epoxide component of the preferred vehicle is a monoepoxide, or blend of monoepoxides of low viscosity (preferably less than 20 cps at 23° C.), examples of suitable monoepoxides being propylene oxide, butylene oxide, butyl glycidyl ether, allyl glycidyl ether and glycidyl phenyl ether. It is quite possible to use mixtures of a number of the satisfactory monoepoxides and, in particular, mixtures of glycidyl alkyl ethers wherein the alkyl group varies from about 8 to about 14 carbons in chain length. Similarly, a variety of polyolefin epoxides, obtained in admixture by epoxidizing low molecular weight byproducts of polyolefin manufacture and having a carbon chain length ranging from 10 to 20 carbons, may also be satisfactorily included in the monoepoxide component of the vehicle. In the blends of the Watt patent referred to above, the monoepoxide does not constitute more than 15% by weight and is present only as an additional component with an epoxidic prepolymer material. In the practice of this invention these limits do not apply and satisfactory coatings have been derived from such monoepoxides when present in amounts greater than 15% and also in the absence of an epoxidic prepolymer material.

C. Prepolymeric Material

The epoxide-based vehicle component of the preferred type of coating may also contain a prepolymer of relatively low epoxy equivalent weight (below about 200) which may be a single material or a blend of materials selected from the following prepolymer types: (1) a glycidyl-bisphenol A polyether type of epoxy resin prepolymer, (2) a polyglycidyl ether of a polyhydric alcohol, (3) a polyepoxidized phenol or cresol novolak or (4) a diepoxide of a cycloalkyl or alkyl-cycloalkyl hydrocarbon or ether, the preparation and properties of these prepolymer materials being described in detail in said U.S. Pat. No. 3,794,576, previously mentioned. As utilized herein, such components may comprise from 10 to 85% by weight of the epoxy blend.

Catalyst Precursor

The catalyst precursor effective to initiate the epoxide polymerization in the white opaque coatings of this invention is 2,5-diethoxy-4-p-(tolythio)-benzene diazonium hexafluorophosphate. Other catalyst precursors of the same class as disclosed in U.S. Pat. No. 3,794,576 although effective to initiate polymerization have been found to be unsatisfactory herein either because of off-white, gray or yellow coatings produced, or unsatisfactory appearance such as wrinkling or embrittlement of the final cured coating. In general the catalyst is present in amounts sufficient to initiate polymerization and may vary from about 0.1 to about 5% of the weight of the composition.

Flow Control Agents

In order to obtain a high degree of smoothness and even thickness of the coating as applied to a substrate of metal, paper or plastic, it is desirable to incorporate in the coating composition a small percentage of a flow control agent such as a polyvinyl butyral resin, a silicone resin or a high molecular weight unsaturated fatty acid, the function of these materials being to modify the surface properties of the composition to avoid ridging, unevenness and pinholing in the thinly spread coating layer. Especially preferred as a flow control agent herein is a polyvinyl butyral resin containing vinyl alcohol and vinyl acetate groups commercially available as "B-76" (Monsanto). However, it will be understood that such agents are not essential to the successful operation of the invention and are merely preferred for optimum results.

The radiation required to effectively decompose the catalyst precursor may be electromagnetic or that emanating from an electron beam. The required radiation is preferably electromagnetic and most desirably is that at those regions of the spectrum at which there is high absorption of the electromagnetic radiation by the particular catalyst precursor. More than one type of radiation may be employed, e.g. ultraviolet light radiation followed by electron beam or postheating may be employed. The source of the radiation can be any suitable source such as the ultraviolet actinic radiation produced from a mercury, xenon or carbon arc lamp or the electron beam produced in a suitably evacuated cathode ray gun, the only requirement being that it must impart to the irradiated composition energy at an intensity level high enough to reach the decomposition level of the catalyst precursor.

The following examples will serve to further illustrate the invention in which the coating properties were determined as follows:

Adhesion: A sharp pointed metal prick punch was used to scratch an "X" on the coated metallic plate, the scratch marks passing completely through the coating to expose the bare metal of the substrate. The coated plate was then immersed in water at 160° F. for 20 minutes, dipped in cold water and dried with a towel. Pressure-sensitive tape was firmly applied to the coated plate surface in the area of the scratch marks and then stripped from the surface. Adhesion of the coating to the substrate was graded in terms of the amount of coating which stripped off with the pressure-sensitive tape. The adhesion is rated "Good" if none of the coating is removed by the pressure-sensitive tape, "Fair" if only small flakes of coating in the immediate proximity of the scratch marks are removed and "Poor" if any substantial area of the coating near the scratch marks is stripped off with the pressure-sensitive tape.

Flexibility: The coated metal sheet is subjected to a reverse impact (i.e., from the back side of the sample) involving both draw and elongation forces in a forming press which bends the coated metal into a U-shape having a radius of curvature of 0.050–0.090 inches. The metal deformation is effectively accomplished by forming the coated sheet in a press for shaping metal can ends, which forms, in the countersink area of the can end, a curvature of the desired radius accompanied by a 5–8% elongation of the stressed metal in the area of the countersink bend. After bending the sample to the desired radius, the sample is immersed for 10 minutes in an acidic copper sulfate solution (26.5 ounces of copper sulfate hexahydrate and 6.5 ounces of concentrated hydrochloric acid in one gallon of aqueous solution). Failure of the coating to adhere tightly to the substrate in the stressed area due to brittleness or lack of flexibility is indicated by the deposition of a black coating of copper in the areas of coating failure. The degree of coating failure in the stressed area of the sample is rated visually on a basis of a scale ranging from 0 to 10, a low numerical value indicating a more flexible coating and a higher numerical value indicating varying degrees of cracking and failure of the coating due to brittleness.

Blush: Blush is a hazy or dull appearance which may appear on the surface of the coated sample after immersion in water at 160° F. for 20 minutes, followed by immersion of the sample in cold water. Blush, or surface dullness, is judged visually in comparison with a portion of the coated sample which has not been immersed in hot water.

Whiteness: The whiteness of a cured coated sample is judged visually in comparison with a sample of the same substrate coated with a standard solvent-based non-U.V.-curable white pigmented coating composition. Off-white color, usually a yellowish or grayish tinge, is related primarily to the color of the coating composition rather than to incomplete masking of the substrate by the coating.

EXAMPLE 1

The following composition was prepared as the vehicle component of a pigmented coating, and a titanium dioxide which had been surface treated to leave 4% of aluminum oxide by weight of pigment distributed on the particle surfaces was added in varying amounts as shown in the table to give coating compositions ranging in pigment concentration between 0% and 60% by weight in the composition. The resulting coatings were applied as an evenly distributed film on each of the following metallic substrates: (a) aluminum (Al), (b) tin free sheet steel (TFS) and (c) tin plated steel (TPS). The coating was applied in an amount equal to 60 mg. of coating per 4 sq. in. of the substrate surface. The coated metal sheets were subjected to the ultraviolet radiation from a Uviarc Raymaster lamp for a period of 10 seconds (15 seconds for samples containing over 37% of pigment) and post-heated in a 300° F. oven for 5 minutes to effect a cure of the coating.

Coating Composition (All Parts By Weight)

Vehicle Component:
24 parts of (3,4-epoxycyclohexyl) methyl 3,4-epoxycyclohexanecarboxylate (available commercially as CY-179 - (CIBA-GEIGY)
14 parts of butyl glycidyl ether (available commercially as RD-1 - CIBA-GEIGY)
1 part of polybutyral resin
0.4 parts of 2,5-diethoxy-4-(p-tolylthio) benzene diazonium hexafluorophosphate Pigment Component:
Varying amounts of titanium dioxide pigment bearing 4% alumina as a result of surface treatment.

The results were as indicated in Table I which follows:

Table I

Effect of TiO$_2$ Concentration On Coating Properties

| % TiO$_2$ | Base Metal* | Flexibility | Adhesion** | 20′ 160° F Blush | Film Appearance |
|---|---|---|---|---|---|
| 0% | Al | 3,3 | G | None | Glossy |
| | TFS | 7,8 | G | " | " |
| | TPS | 8,9 | G | " | " |
| 10-15% | Al | 2,2 | G | None | Glossy |
| | TFS | 6,7 | G | " | " |
| | TPS | 8,9 | G | " | " |
| 27 | Al | 2,2 | G | None | Glossy |
| | TFS | 7,8 | G | " | " |
| | TPS | 8,9 | G | " | " |
| 30 | Al | 10,10 | G | None | Glossy |
| | TFS | 10,10 | G | " | " |
| | TPS | 10,10 | G | " | " |
| 32.5 | Al | 10,10 | G | None | Glossy |
| | TFS | 10,10 | G | " | " |
| | TPS | 10,10 | G | " | " |
| 35 | Al | 2,2 | G | None | Glossy |
| | TFS | 2,4 | G | " | " |
| | TPS | 5,7 | G | " | " |
| 37 | Al | 2,2 | G | None | Glossy |
| | TFS | 6,6 | G | " | " |
| | TPS | 7,8 | G | " | " |
| 39 | Al | 2,2 | G | None | Glossy |
| | TFS | 3,3 | G | " | " |
| | TPS | 6,7 | G | " | " |
| 45 | Al | 3,5 | G | None | Glossy |
| | TFS | 5,6 | G− | " | " |
| | TPS | 7,8 | F | " | " |
| 50 | Al | 1,8 | G | V. slight | Med. Glossy |
| | TFS | 4,7 | G− | " | " |
| | TPS | 7,8 | F+ | " | " |
| 55 | Al | 9,9 | G | None | Med. Glossy |
| | TFS | 8,10 | G− | " | " |
| | TPS | 10,10 | P | " | " |
| 60 | AL | 7,9 | G | V. slight | Dull |
| | TFS | 7,8 | G | " | " |
| | TPS | 10,10 | F | " | " |

*Al is Aluminum
TFS is Tin Free Steel
TPS is Tin Plated Steel
** G = Good
F = Fair
P = Poor It will be seen from the above results that from about 35% to about 40% is the optimum level of pigmentation, there being a great improvement in flexibility over lower loading levels without interference of the cure rate. Above 40%, there is about a 50% increase in UV exposure time necessary for equivalent cure. At higher levels (50–60%) there is a drop off in adhesion, flexibility and gloss.

EXAMPLE 2

To illustrate the effect of the titanium surface treatment, the following experiments were performed.

The following vehicle was prepared to contain:
24 parts CY-179
12 parts RD-1
2 parts polybutyral resin
20 parts TiO$_2$ pigment
0.4 parts 2,5-diethoxy-4-(p-tolylthio) benzene diazonium hexafluorophosphate Titanium dioxide pigments with various surface treatments were substituted in the above formulation to prepare coatings on aluminum can ends at a coating weight of 60 mg./4 sq. in. after which the coated samples were either irradiated as in Example 1 for 10 seconds and post-heated in a 300° F oven for 5 minutes or irradiated for 10 seconds after which they were set aside for the number of days indicated by the number in parenthesis. The resulting coatings were evaluated as shown in Table II.

Table II

Effect of Titanium Dioxide Surface Treatment

| Formulation | TiO$_2$ | Surface Treatment | Cure | Flexibility | Adhesion 20′ 160° F | Blush |
|---|---|---|---|---|---|---|
| 1 | R-11 (Glidden) | Al$_2$O$_3$ + amine | U.V. + bake | 2,3 | P | None |
| | | | U.V. only (8) | 2,5 | P | V. Slight |
| 2 | RCL9 (Glidden) | Hydrous; No oxide | U.V. + bake | 1,1 | F | None |
| | | | U.V. only (8) | 8,8 | P | V. Slight |
| 3 | R-77 (Glidden) | Al$_2$O$_3$ + silica | U.V. + bake | 1,2 | P | None |
| | | | U.V. only (6) | 1,2 | P | V. Slight |
| 4 | R-910 (du Pont) | Al$_2$O$_3$ | U.V. + bake | 1,3 | G | None |
| | | " | | 1,2 | G− | V. Slight |
| 5 | R-960 (du Pont) | Al$_2$O$_3$ + silica | U.V. + bake | 1,2 | G− | None |
| | | | U.V. only (5) | 1,3 | P | V. Slight |
| 6 | R-902 (du Pont) | Al$_2$O$_3$ + silica | U.V. + bake | 2,3 | P | None |
| | | | U.V. only (6) | 2,3 | P | V. Slight |
| 7 | R-912 (du Pont) | Al$_2$O$_3$ + amine | U.V. + bake | 6,6 | P | None |
| | | | U.V. only (4) | 1,6 | P | None |
| 8 | Titanox PL (Titanium Pigment Corp.) | Al$_2$O$_3$ + silica | U.V. + bake | 2,2 | F | None |
| | | | U.V. only (4) | 6,7 | F | None |
| 9 | Titanox A-MP | Anatase | U.V. + Bake | 10,10 | P | None |

Table II-continued

| Formu- lation | TiO$_2$ | Surface Treatment | Cure | Flexi- bility | Adhesion 20' 160° F | Blush |
|---|---|---|---|---|---|---|
| | (Titanium Pigment Corp.) | Al$_2$O$_3$ + silica | U.V. only (5) | 7,8 | P | None |
| 10 | O-310 (American Cyanamide) | Anatase Al$_2$O$_3$ | U.V. + bake | 0,1 | G | None |

Of the pigments tested, only Preparation Nos. 4 and 10 have alumina as the sole treatment. The other titanium dioxides either have no treatment or alumina in combination with other treatments. When alumina is not present or is not the sole treatment, a common deficiency is scotch tape adhesion loss after pasteurization. Other deficiencies are loss of gloss and yellowing of the coating.

EXAMPLE 3

The coating vehicle and method of Example 2 was repeated except that only alumina treated TiO$_2$ in accordance with the invention were utilized. The results were as reported in Table III which follows:

Table III

| | | | Alumina Treated Rutile TiO$_2$ | | |
|---|---|---|---|---|---|
| | | Flex- ibil- | 20' 160° F | | |
| TiO$_2$ | Plate | ity | Adhesion | Blush | Comments |
| R-910 | Al | 1,1 | G | None | Glossy, smooth |
| (du Pont) | TFS-CT | 2,3 | G | " | " |
| | TPS | 6,6 | G | " | " |
| R-900 | Al | 0,0 | G | None | Glossy, smooth |
| (duPont) | TFS-CT | 2,2 | G | " | " |
| | TPS | 2,6 | G- | " | " |
| R-99 | Al | 2,3 | G | None | Glossy, smooth |
| (Glidden) | TFS-CT | 3,5 | G | " | " |
| | TPS | 6,6 | G | " | " |
| OR-600 | Al | 1,2 | G | None | Glossy, smooth |
| (American | TFS-CT | 1,3 | G | " | " |
| Cyanamide) | TPS | 3,6 | G | " | " |

It will be seen from the above that alumina treated titanium dioxides consistently give excellent over-all coating properties in accordance with this invention.

EXAMPLE 4

To illustrate the effect of the epoxy-ester and radiation initiator components of the invention, the following experiments were conducted.

A. A formulation comprising
24 parts CY-179
12 parts RD-1
2 parts polybutyral resin
20 parts R-910 pigment
0.4 parts p-morpholinobenzene diazonium hexafluorophosphate was applied to various metal substrates as in Example 1. The results were as follows:

| TiO$_2$ (Alumina treated) | Plate | Flexibility | 20' 160° F Adhesion | Blush | Comments |
|---|---|---|---|---|---|
| R-910 | Al | 10,10 | G | Slight | Dull Surface |
| | TFS | 10,10 | G | " | " |
| | TPS | 10,10 | G | " | " |

B. Several formulations were prepared as follows:
1.
24 parts Araldite 6004 (liquid DGEBA resin; CIBA-GEIGY)
12 parts RD-1
1 part polyvinylbutyral resin
20 parts R-910 alumina treated TiO$_2$
0.4 parts 2,5-diethoxy-4-(p-tolylthio) benzene diazonium hexafluorophosphate
2.
12 parts Araldite 6004
12 parts CY-179
12 RD-1
1 part polyvinylbutyral resin
20 parts R-910 pigment
0.4 parts catalyst as in (1)
3.
18 parts Araldite 6004
18 parts RD-2 (1,4-butanediol diglycidyl ether; CIBA-GEIGY)
20 parts R-910 pigment
0.4 parts catalyst as in (1)
4.
16 parts Araldite 6004
20 parts RD-2
20 parts R-910 pigment
0.4 parts p-chlorobenzenediazonium hexafluorophosphate
5.
24 parts CY-179
12 parts RD-1
2 parts polyvinyl butyral resin
20 parts R-910 pigment
0.15 part catalyst as in (1)
0.15 part catalyst as in (4)
6.
24 parts CY-179
12 parts RD-1
2 parts polybutyral resin
20 parts R-910 pigment
0.4 parts p-chlorobenzene diazonium hexafluorophosphate
7.
Same as formulation (5) except catalyst is:
0.2 part catalyst as in (1)
0.1 part catalyst as in (2)
8.
Same as formulation (5) except catalyst is:
0.4 parts catalyst as in (1)

Coatings were prepared on various metal substrates employing the procedure of Example 1 except that exposure times were varied as indicated in Table IV below in which the results of the experiments are also tabulated.

Table IV

Effect of Epoxy Ester and Catalyst

| Preparation No. | Plate | Flexibility | Dry Adhesion | 20' 160° F Adhesion Blush | Comments |
|---|---|---|---|---|---|
| 1 (Comparative) | Al, TFS, TPS | All samples wet after 15 second U.V. exposure and still tacky after 300° F bake; Not completely cured and slightly tacky after 400° F bake | | | |
| 2 | Al | 2,3 | G | G None | Glossy, smooth |
|  | TFS | 4,6 | G | G " | " |
|  | TPS | 3,3 | G | G " | " |
| 3 (Comparative) | Al, TFS, TPS | All samples slightly wet after 15 second U.V. exposure; coating soft after 5 min. bake at 300° F | | | |
| 4 (Comparative) | Al | 1,1 | G— | F None | Glossy, smooth |
|  | TFS | 3,4 | P | F " | " |
|  | TPS | 3,5 | P | P " | " |
| 5* (Comparative) | Al | 4,5 | — | G | Poor flowout; streaks |
|  | TFS | 1,3 | — | G | Semi-Glossy |
|  | TPS | 5,6 | — | G | Semi-Glossy |
| 6* (Comparative) | Al | 10,10 | | None | Dull Surface |
|  | TFS | 10,10 | | " | " |
|  | TPS | 10,10 | | " | " |
| 7* (Comparative) | Al | 1,1 | — | G | Glossy; good flowout; Streaks |
|  | TFS | 6,6 | — | G | " |
|  | TPS | 3,7 | — | G | " |
| 8* | Al | 1,2 | — | G | Glossy, good flowout; clear |
|  | TFS | 2,3 | — | G | " |
|  | TPS | 8,8 | — | G | " |

*U.V. exposure 3-5 seconds + 5 minutes bake at 300° F

It will be apparent from the above Table IV that the epoxy ester and 2,5-diethoxy-4-(p-tolythio) benzene diazonium hexafluorophosphate catalyst are essential components to the satisfactory properties of the coatings obtained. It will be seen from a comparison of Preparation Nos. 1, 2 and 3 that in the absence of the ester, samples do not cure under the short exposure times while in the presence of the ester, satisfactory coatings are obtained. Preparation Nos. 4, 5, 6, 7 and 8 illustrate the effect of the catalyst on overall properties obtained and especially Preparation Nos. 5 to 8 wherein mixtures of catalysts are employed with increasing relative proportions of the catalyst of the invention with accompanying improvement in overall coating properties being obtained.

It is thought that the invention and many of its attendant advantages will be understood from the foregoing description and it will be apparent that various changes may be made in the composition described without departing from the spirit and scope of the invention, the form hereinbefore described being merely a preferred embodiment thereof.

I claim:

1. A white photopolymerizable coating composition comprising (1) a blend of liquid epoxide materials polymerizable to higher molecular weights through the action of a cationic catalyst comprising an epoxidic ester having two epoxycycloalkyl groups, said ester constituting at least about 15% of the weight of the epoxide materials in the blend; (2) an aluminum oxide coated titanium dioxide pigment in an amount effective to color the composition to about 50% by weight of the composition and (3) as a radiation-sensitive catalyst effective to initiate polymerization of said epoxide materials upon exposure to irradiation, 2,5-diethoxy-4-(p-tolylthio) benzene diazonium hexafluorophosphate.

2. A white photopolymerizable coating composition as claimed in claim 1, in which said pigment is rutile titanium dioxide coated with from about 1 to about 10% alumina, based on the weight of the titanium dioxide.

3. A white photopolymerizable coating composition as claimed in claim 2, in which said pigment is present in an amount of about 35% to 40% by weight.

4. A white photopolymerizable coating composition as claimed in claim 3, in which said epoxide materials include at least one epoxidic prepolymer material having an epoxy equivalent weight below about 200.

5. A white photopolymerizable coating composition as claimed in claim 4 wherein said epoxidic prepolymer constitutes between about 10% and 85% by weight of the epoxide materials in the composition and is selected from the group consisting of A. an epoxy resin prepolymer consisting predominantly of the monomeric diglycidyl ether of bisphenol A B. a polyepoxidized phenol novolak or cresol novolak C. a polyglycidyl ether of a polyhydric alcohol and D. a diepoxide of a cycloalkyl or alkyl cycloalkyl hydrocarbon or ether.

6. A white photopolymerizable coating composition as claimed in claim 5, in which from about 0.25% to about 3.0% by weight of a flow control agent is present.

7. A white photopolymerizable coating composition as claimed in claim 3 in which said epoxidic material includes a monoepoxide.

8. A white photopolymerizable coating composition comprising: (1) a blend of liquid epoxide materials consisting essentially of: at least one epoxidic prepolymer material having an epoxy equivalent weight below 200 and constituting between about 10% and about 85% of the weight of the epoxidic materials in the composition and an epoxidic ester having two epoxycycloalkyl groups and constituting at least about 15% of the weight of the epoxidic materials; (2) from about 35% to about 40% of a rutile titanium dioxide pigment having from about 1% to about 10% by weight of alumina coated on its surfaces and (3) as a radiation-sensitive catalyst effective to initiate polymerization of said epoxide materials upon exposure to irradiation, 2,5-diethoxy-4-(p-tolylthio) benzene diazonium hexafluorophosphate.

9. A white photopolymerizable coating composition as claimed in claim 8, in which the epoxide blend comprises a diglycidyl ether of bisphenol A, 1,4-butanediol diglycidyl ether and 3,4-epoxycyclohexylmethyl-3,4-epoxycyclohexane carboxylate.

10. A white photopolymerizable coating composition as claimed in claim 9 in which said epoxide blend also includes a monoepoxide.

11. A white photopolymerizable coating composition comprising: (1) a blend of liquid epoxides materials consisting essentially of: at least one monoepoxide and an epoxidic ester having two epoxycycloalkyl groups and constituting at least about 15% of the weight of the epoxidic materials; (2) from about 35% to about 40% of a rutile titanium dioxide pigment having from about 1% to about 10% by weight of alumina coated on its surfaces and (3) as a radiation-sensitive catalyst effective to initiate polymerization of said epoxide materials upon exposure to irradiation, 3,5-diethoxy-4-(p-tolylthio) benzene diazonium hexafluorophosphate.

12. A white photopolymerizable coating composition as claimed in claim 11, in which said blend comprises butyl glycidyl ether and 3,4-epoxycyclohexylmethyl-3,4-epoxycyclohexane carboxylate.

13. A white photopolymerizable coating composition as claimed in claim 12, in which from about 0.25% to about 3% by weight of a flow control agent is present.

14. A white photopolymerizable coating composition as claimed in claim 13, in which the flow control agent is a polyvinylbutyral resin.

* * * * *